United States Patent [19]

Rambaud, deceased et al.

[11] Patent Number: 4,655,985

[45] Date of Patent: Apr. 7, 1987

[54] METHOD FOR MANUFACTURING DECORATIVE PANELS

[75] Inventors: Jean-Michel Rambaud, deceased, late of Saint-Jorioz; by Jacques Autour, legal representative, Annecy, both of France

[73] Assignee: Patrick Rambaud, Boulogne, France

[21] Appl. No.: 644,461

[22] Filed: Aug. 24, 1984

Related U.S. Application Data

[60] Continuation of PCT FR 83/00262, filed Dec. 27, 1983, published as WO 84/02480 on Jul. 5, 1984.

[30] Foreign Application Priority Data

Dec. 28, 1982 [FR] France ................................ 82 21947

[51] Int. Cl.[4] ......................... B29C 51/42; B05D 3/02; B05D 3/12; B05D 5/00

[52] U.S. Cl. .................................... 264/320; 427/267; 427/269; 427/270; 427/290; 427/292; 427/348

[58] Field of Search ............... 427/273, 348, 267, 269, 427/270, 290, 292; 428/207, 204; 4/234, 237, 584; 264/320

[56] References Cited

U.S. PATENT DOCUMENTS

| | | | |
|---|---|---|---|
| 2,115,433 | 4/1938 | Soule | 428/204 |
| 3,234,038 | 2/1966 | Stephens et al. | 117/71 |
| 3,615,731 | 10/1971 | Short | 106/1 |
| 3,713,870 | 1/1973 | Kaye | 117/71 |
| 3,764,067 | 10/1973 | Coffey et al. | 427/216 X |

FOREIGN PATENT DOCUMENTS

| | | |
|---|---|---|
| 0022029 | 7/1981 | European Pat. Off. . |
| 0080840 | 6/1983 | European Pat. Off. . |
| 1372407 | 8/1964 | France . |
| 2247061 | 5/1975 | France . |
| 2381635 | 9/1978 | France . |
| 2498127 | 7/1982 | France . |
| 1009618 | 11/1965 | United Kingdom . |

OTHER PUBLICATIONS

"Webster's New Collegiate Dictionary", Springfield, Mass., G & C Merriam Company, 1981, p. 1099.

Hawley, G. G., "The Condensed Chemical Dictionary", New York, Van Nostrand Reinhold Company, 1977, p. 806.

Lapedes, D. N. (Editor in Chief), "McGraw-Hill Dictionary of Scientific and Technical Terms", New York, McGraw-Hill Book Company, 1974, p. 1379.

*Primary Examiner*—Evan K. Lawrence
*Attorney, Agent, or Firm*—Pollock, Vande Sande & Priddy

[57] ABSTRACT

Decorative panels are prepared employing a support of a transparent material having one of its faces dulled to enhance adhesion of a lacquer thereon. The processes also include applying a layer of a volatile liquid carrier containing metal and/or metal oxide particles. Also applied is a lacquer that is not miscible with the volatile liquid carrier. In one of the embodiments, the liquid carrier thrusts back the lacquer forming holes in the lacquer to reach the dulled surface of the support and adhere thereto. In the resultant panel, the particles are visible through the thickness of the transparent support at locations corresponding to the holes in the lacquer.

30 Claims, No Drawings

METHOD FOR MANUFACTURING DECORATIVE PANELS

CROSS-REFERENCE TO RELATED APPLICATION

This application is a continuation of PCT Application No. PCT/FR83/00262 filed on Dec. 27, 1983, published as WD84/02480 on Jul. 5, 1984.

TECHNICAL FIELD

The invention is concerned with a method for manufacturing decorative panels which can be used as wall panels, covering panels for furniture, sanitary appliances, for example.

PRIOR TECHNIQUE

The majority of decorative panels having a metallized appearance which can at present be seen on the market are unsatisfactory from the point of view of external appearance. The method which is most commonly employed consists in applying a ground coat of paint on one face of a support panel, then in spraying a layer of metal particles on which is applied a coat of colorless varnish which is polished in order to provide the panel with a glossy appearance. In the panels thus obtained, the metal particles are displayed through the layer of varnish and are seen to be laid on the ground coat of paint and not mixed therewith, which is unsatisfactory from the point of view of general appearance.

Moreover, once they have been manufactured, these decorative panels do not withstand any deformation and can therefore be employed solely as wall panels or panels for covering flat surfaces.

SUMMARY OF THE INVENTION

It is one object of the invention to provide a method for manufacturing decorative panels, especially panels having a metallized appearance, which makes it possible to obtain highly attractive panels in all desired colors and in which the metallized portions are intimately combined with the painted portions without any interruption of continuity.

It is also an object of the invention to provide a method of this type which makes it possible to obtain decorative panels from several types of supporting materials.

It is in particular an object of the invention to provide a method for producing decorative panels of this type which are obtained from supports of plastic material.

It is also an object of the invention to provide a method for manufacturing decorative panels such that these latter can subsequently be processed for obtaining articles having a wide range of different shapes.

In accordance with the invention, there is initially employed a support of transparent material which permits perfect adhesion of a lacquer or paint, one face of the support is dulled, a powder consisting of particles and in particular metallic particles in a fine suspension in a solvent (i.e., volatile liquid carrier) is applied over all or part of the dulled surface according to the desired effect, an air stream is directed onto the surface if desired in order to cause migration of the powder in suspension in the solvent so as to modify the decorative effect and at least one coat of lacquer of any desired color is applied as a ground coat, the assembly being visible through the thickness of the transparent support.

The decorative panels thus obtained display in transparency, through the thickness of the support which in fact constitutes the top layer of the panel, portions which are metallized or have a similar appearance according to the particles employed which appear to be intimately associated both with the support itself and with the subsequently-applied lacquer and which, in contrast to the panels at present available on the market, do not appear in any instance to be "added" to a painted base. It has never been possible up to the present time to obtain such an effect which has a highly attractive appearance.

The invention also proposes, before applying the metal powder or the like in suspension in the solvent, to apply on one face of the transparent material a coat of primary transparent varnish which is conducive to good adhesion of the lacquer over the entire surface of the support, in particular through portions which are metallized or have a similar appearance.

In accordance with a preferred form of embodiment of the invention, the initial operation consists in applying a very thin coat of lacquer of uniform thickness and of any desired color on the support of transparent material after one face of this latter has been dulled, a solvent which is not miscible with the lacquer is applied prior to drying of the lacquer over all or part of the surface of the support, there is applied on the first solvent layer prior to evaporation of this latter a second layer of the same solvent in which the metal particles or the like are in a fine suspension, a compressed air stream is delivered if desired in order to cause the metal powder or the like to migrate as a function of the desired decorative effect and the solvent is allowed to evaporate. In this case also, there can be observed in transparency through the thickness of the support portions which are metallized or have a similar appearance and painted portions intimately blended with each other without any interruption of continuity.

The invention is applicable to any transparent support material which is capable of receiving a perfectly adherent coat of lacquer. It can thus be applied to glass or else to transparent plastic materials, especially methyl methacrylate, cellulose acetate, etc.

By choosing a thermoformable plastic material and on the understood condition that use is made of lacquers and solvents which do not decompose at the thermoforming temperature, it is possible to obtain objects having any desired shapes. When methyl methacrylate of the so-called "sanitary" grade is employed, the decorative panels in accordance with the invention can in particular be thermoformed for the purpose of obtaining sanitary appliances such as bathtubs, washbasins, etc. In point of fact, it has never been possible up to the present time to obtain sanitary appliances of plastic material having a metallized appearance and a high decorative quality.

BEST AND VARIOUS MODES FOR CARRYING OUT THE INVENTION

The method in accordance with the invention in its preferred modes of execution is described hereinafter in greater detail.

In the first mode of execution, the initial operation consists in dulling one face of the transparent support material in order to promote adhesion of the lacquer which will be applied in a subsequent step. The dulling operation is carried out by any suitable technique, for example with sandpaper.

A metal powder in fine suspension in a solvent is then applied over all or only part of the dulled surface according to the decorative effect desired. The fact of applying the metal powder in suspension in a solvent and not spraying the powder alone on a support plate makes it possible to spread the powder as desired without any risk of forming piles of metal particles.

If desired, and again with a view to obtaining a particular metallized decorative effect, a compressed air stream can be directed onto the applied layer of solvent in order to cause the metal powder in suspension to migrate in any desired direction.

There is then applied a coat of paint or lacquer of any desired color which will constitute the background of the panel.

By lacquer is meant any liquid product colored by any suitable pigment, which can readily be applied on the support and which produces a durable colored layer on the support after drying. Use is made in particular of the polyurethane lacquers, acrylic resins, vinyl resins, etc.

Apart from the fact that it must clearly not attack the support material, the solvent employed for applying the metal powder must be chosen so as to be immiscible with the lacquer to be applied in a subsequent step. By virtue of this characteristic feature, at the time of application of the lacquer, this latter will "thrust back" the solvent at point locations by virtue of its immiscibility with the solvent and will be able to pass between the metal particles and reach the dulled surface of the support in order to adhere to this latter.

As can readily be understood, it is possible to apply several coats of lacquer of different colors according to the decorative effect which is sought.

In regard to the choice of metal powder, use is made of powders of metal or metal oxide particles having a particle diameter such that it remains in fine suspension in the solvent employed. It is of course possible to employ a mixture of metal particles of different types.

It has been found in contrast to a generally accepted belief in this field that wholly satisfactory adhesion of the lacquer to the support could be obtained even through the applied layer of metal powder.

However, in order to ensure that the good adhesion of the lacquer is promoted and made more durable, the invention proposes to apply on the support prior to the metal powder a layer of transparent or so-called "primary" varnish, especially a varnish constituted by a very fluid polyester resin having a single component such as the polyester varnish sold under the trade name "SIKKENS".

The second mode of execution of the invention is distinguished from the mode described above by the fact that, prior to the coating of metal powder, a lacquer of any desired color is applied on the transparent support.

The initial operation also consists in dulling one face of the transparent support material in order to score it in a uniform manner. As in the previous instance, the dulling operation can be performed with sandpaper.

There is then applied a thin coat of lacquer of uniform thickness and having any desired color.

It is possible to employ any type of lacquer as a function of its good adhesion to the transparent support employed, for example polyurethane lacquers, acrylic resins or vinyl resins. On a methyl methacrylate support, for example, it is an advantage to employ a polyurethane lacquer which is suitably diluted for easy application in a very small thickness.

The thickness of the coat of lacquer must be of the order of tens of microns for reasons which will become apparent hereinafter.

There is then applied over all or part of the panel surface a first layer of a solvent which is not miscible with the lacquer and then, prior to evaporation, a second layer of the same solvent in which metal particles are in fine suspension.

The solvent employed must imperatively be nonmiscible with the lacquer in order to make it possible virtually to thrust back the lacquer or form "holes" in the lacquer at the locations in which it is applied, with the result that, when the metal powder in suspension in the solvent aforesaid is subsequently applied, it will become visible through the thickness of the transparent support at the locations in which the lacquer has been thrust back. It is precisely in order to ensure that the metal particles are visible through the transparent material that the coat of lacquer applied in the first place must have a very small thickness.

When making use of a polyurethane lacquer, the solvent employed is advantageously a cellulose solvent. When the lacquer employed is an acrylic resin, a polyurethane solvent is employed for example and, if the lacquer is a resin or a vinyl ink, it is possible in that case of employ a solvent which is either of the cellulose type or polyurethane.

When the second solvent layer containing the metal particles in suspension is applied, the solvent can be allowed to evaporate as it stands or else, in order to modify the decorative appearance, it is possible to send prior to evaporation of the solvent a compressed air stream which causes the metal particles entrained by the solvent to migrate in the desired direction or directions; the action of the solvent is again such that it "thrusts back" the lacquer in the locations which it reaches and allows the metal particles to become visible through the support material.

The solvent is then allowed to evaporate and the lacquer is permitted to harden by drying.

The panels thus obtained have a decorative appearance of very high quality and can be employed as they stand.

It is preferable, however, after complete drying of the first coat of lacquer, to apply at least one ground coat of lacquer of the same nature as the first applied coat and having any desired background color.

In regard to the choice of ground coat, one can begin by applying a lacquer of a given color at the location in which the metal powder has been applied, then by covering the entire surface of the panel with a lacquer of another color.

The different layers, namely lacquer and solvent, are advantageously applied by compressed-air spray-gun or by an airless spray-gun. It is understood, however, that consideration can be given to any other type of application which makes it possible to obtain uniform layers of any desired thickness, especially in regard to the first coat of lacquer.

As in the first mode of execution, the metal powder employed consists either of metal particles or of metal oxide particles, for example particles of aluminum, copper, gold, bronze etc. It is also possible to employ a mixture of particles of different types.

The particles employed must have a very small grain size, more precisely a sufficiently small grain size to ensure that they can readily be transported by the solvent without piling-up or remaining at the point of the support at which they are applied and yet a sufficiently large grain size to be capable of remaining in suspension in the solvent.

In order to obtain more rapid drying of panels, it is possible after application of the final coat of lacquer to place them in an oven, for example at 30°-35° during a minimum period of 12 to 16 hours and up to 24 hours.

The decorative panel obtained can then be employed for any desired purpose.

If a thermoformable support material is chosen, the decorative panels in accordance with the invention can in that case permit the manufacture of objects of the most different kinds and of all shapes which can be obtained by thermoforming.

In the preferred form of embodiment of the invention, the transparent support material is methyl methacrylate.

The panels obtained can accordingly be employed as wall facing panels, furniture covering panels, etc.

In particular, when a thermoformable methyl methacrylate of the so-called "sanitary" grade is employed, it is possible to obtain by thermoforming all kinds of sanitary appliances such as bathtubs, washbasins, etc. which, by virtue of their metallized decorative appearance, can be considered as articles of very high quality.

The method in accordance with the invention can also be applied to other plastic materials, for example on flexible sheets of transparent cellulose acetate. The decorative sheets obtained can in that case be employed for the manufacture of lamp-shades.

EXAMPLE

There is employed at the outset a plate of methyl methacrylate of the so-called "sanitary" grade having dimensions of 1 m×2 m×5 mm.

After dulling of one of the surfaces with sandpaper having a grain size of 400, a layer of acrylic resin lacquer having a black color and a thickness of approximately 20 microns is applied by compressed-air spray-gun.

On the central zone, for example, there is applied a film of cellulose solvent and immediately, that is to say prior to evaporation of the solvent, a layer of the same cellulose solvent containing a fine suspension of pale gold particles is applied by compressed-air spray-gun.

A stream of compressed air is directed onto the zone which is covered with metal powder within the solvent in such a manner as to spread and cause migration of the particles in certain directions.

The solvent is then allowed to evaporate and the coat of lacquer is allowed to dry.

After complete drying, there is applied over the entire panel surface a coat of black acrylic resin lacquer of sufficient thickness to ensure that the final panel is opaque.

The panel is then placed in an oven at 30°-35° C. for a period of 24 hours.

The decorative panel obtained displays by transparency through the thickness of the plate of methyl methacrylate a metallized central zone having a gold color and intimately blended with zones having a black color provided by the coats of lacquer.

This panel has been employed for the manufacture of a bathtub by thermoforming.

I claim:

1. A method for manufacturing a decorative panel which comprises:
   - dulling one face of a support of transparent material to enhance the adhesion of a lacquer thereon;
   - applying a layer of a primary transparent varnish which is conducive to good adhesion of said lacquer over the entire dulled face of the support;
   - applying over at least part of the surface of the transparent varnish a powder of metal and/or metal oxide particles in a fine suspension in a volatile liquid carrier;
   - applying at least one coat of said lacquer, which is not miscible with said liquid carrier, as an outer colored coating such that said lacquer thrusts back said liquid carrier at point locations to reach said layer of a primary transparent varnish and adhere thereto to thereby provide a decorative panel having both the particles and lacquer visible through the thickness of the transparent support.

2. The method of claim 1 wherein the primary transparent varnish is of the polyester type.

3. The method of claim 1 which comprises dulling said one face with sandpaper.

4. The method of claim 1 wherein said particles are selected from the group consisting of gold, copper, aluminum, bronze, oxides thereof, and mixtures thereof.

5. The method of claim 1 wherein the grain size of said particles is such that the particles remain in fine suspension in the volatile liquid carrier.

6. The method of claim 1 wherein the applying is by spraying with a compressed-air spray-gun or with an airless spray-gun.

7. The method of claim 1 which further comprises placing the panel in an oven after applying the outer coating.

8. The method of claim 1 wherein said support is polymethyl methacrylate.

9. The method of claim 8 wherein said polymethyl methacrylate is thermoformable.

10. The method of claim 7, wherein said support is thermoformable polymethyl methacrylate, and which further comprises, after placing the panel in an oven, thermoforming to thereby obtain an object of the desired shape.

11. The method of claim 10 wherein said object is furniture.

12. The method of claim 10 wherein said object is a sanitary appliance.

13. The method of claim 1 wherein said lacquer is selected from the group consisting of polyurethane lacquer, acrylic resin, and vinyl ink.

14. The method of claim 13, wherein, as the volatile liquid carrier, a cellulose solvent is employed with the polyurethane lacquer, a polyurethane solvent is employed with the acrylic resin, and a cellulose solvent or a polyurethane solvent is employed with the vinyl ink.

15. A method for manufacturing a decorative panel which comprises:
   - dulling one face of a support of transparent material to enhance the adhesion of a lacquer thereon;
   - applying a very thin colored coat of lacquer of uniform thickness on said one face which has been dulled;
   - applying over at least part of the surface of the lacquer prior to drying of the lacquer a volatile liquid carrier which is not miscible with said lacquer so that said liquid carrier thrusts back said lacquer forming holes in the lacquer to reach the dulled surface of the support and adhere thereto;

applying on said liquid carrier, prior to evaporation thereof, a layer of the same liquid carrier containing metal and/or metal oxide particles; and allowing the liquid carriers of the layers to evaporate to thereby dry the layers; and allowing the lacquer to harden to thereby provide a decorative panel with said particles being visible through the thickness of the transparent support at locations corresponding to said holes.

16. The method of claim 15 whereby, after the layers are dried, applying at least one coat of a lacquer of the same type as said very thin coat of lacquer as an outer coating.

17. The method of claim 15 wherein said very thin coat is in the order of tens of microns thick.

18. The method of claim 15 wherein, prior to evaporation of the volatile liquid carrier, an air stream is directed onto the surface to thereby cause the particles to migrate and thereby modify the decorative effect.

19. The method of claim 15 which comprises dulling said one face with sandpaper.

20. The method of claim 15 wherein said particles are selected from the group consisting of gold, copper, aluminum, bronze, oxides thereof, and mixtures thereof.

21. The method of claim 15 wherein the grain size of said particles is such that the particles remain in fine suspension in the solvent volatile liquid carrier.

22. The method of claim 15 wherein the applying is by spraying with a compressed-air spray-gun or with an airless spray-gun.

23. The method of claim 15 wherein said support is polymethyl methacrylate.

24. The method of claim 23 wherein said polymethyl methacrylate is thermoformable.

25. The method of claim 16 which further comprises placing the panel in an oven after applying the outer coating.

26. The method of claim 25 , wherein said support is thermoformable polymethyl methacrylate, and which further comprises after placing the panel in an oven, thermoforming to thereby obtain an object of the desired shape.

27. The method of claim 26 wherein said object is furniture.

28. The method of claim 26 wherein said object is a sanitary appliance.

29. The method of claim 15 wherein said lacquer is selected from the group consisting of polyurethane lacquer, acrylic resin, and vinyl ink.

30. The method of claim 29, wherein as the volatile liquid carrier, a cellulose solvent is employed with the polyurethane lacquer, a polyurethane solvent is employed with the acrylic resin, and a cellulose solvent or a polyurethane solvent is employed with the vinyl ink.

* * * * *